(12) United States Patent
Rosebrugh

(10) Patent No.: US 10,927,876 B1
(45) Date of Patent: Feb. 23, 2021

(54) RIVET NUT FASTENER

(71) Applicant: Robert Rosebrugh, Oxnard, CA (US)

(72) Inventor: Robert Rosebrugh, Oxnard, CA (US)

(*) Notice: Subject to any disclaimer, the term of this patent is extended or adjusted under 35 U.S.C. 154(b) by 259 days.

(21) Appl. No.: 16/179,874

(22) Filed: Nov. 2, 2018

Related U.S. Application Data

(60) Provisional application No. 62/581,018, filed on Nov. 2, 2017.

(51) Int. Cl.
| | |
|---|---|
| *F16B 5/04* | (2006.01) |
| *F16B 37/06* | (2006.01) |
| *F16B 19/10* | (2006.01) |
| *F16B 43/00* | (2006.01) |

(52) U.S. Cl.
CPC ............ *F16B 19/1072* (2013.01); *F16B 5/04* (2013.01); *F16B 43/004* (2013.01); *F16B 37/067* (2013.01); *F16B 2019/1009* (2013.01)

(58) Field of Classification Search
CPC .............. F16B 19/1072; F16B 19/1045; F16B 19/109; F16B 19/1054; F16B 2019/1009; F16B 37/067; F16B 37/065; F16B 5/0266; F16B 13/0875; F16B 5/04; F16B 43/004
See application file for complete search history.

(56) References Cited

U.S. PATENT DOCUMENTS

| | | | |
|---|---|---|---|
| 1,688,087 A * | 10/1928 | Mirzan | ............... F16B 13/0875 |
| | | | 411/360 |
| 2,201,930 A | 5/1940 | Stark | |
| 2,324,142 A * | 7/1943 | Eklund | ............... F16B 19/1072 |
| | | | 411/38 |
| 2,563,976 A | 8/1951 | Torosian | |
| 2,765,134 A | 10/1956 | Hill | |
| 2,950,602 A * | 8/1960 | Lang | ..................... F16B 13/061 |
| | | | 411/23 |
| 3,127,808 A | 4/1964 | Drybread | |
| 3,797,358 A * | 3/1974 | Allender | ............... F16B 13/061 |
| | | | 411/38 |
| 3,892,031 A | 7/1975 | Bisbing | |
| 4,004,486 A | 1/1977 | Schenk | |

(Continued)

FOREIGN PATENT DOCUMENTS

| | | | | |
|---|---|---|---|---|
| EP | 1653091 A1 * | 5/2006 | ............ | F16B 37/067 |
| GB | 536553 A * | 5/1941 | ............ | F16B 37/067 |
| WO | WO2008/091249 | 7/2008 | | |

*Primary Examiner* — Victor D Batson
*Assistant Examiner* — Amit Singh Dhillon
(74) *Attorney, Agent, or Firm* — Eric Karich; Karich & Associates

(57) ABSTRACT

A rivet nut fastener has a cylindrical nut having a length that extends from a proximal end having an outwardly extending flange, through a central portion, to a distal end; a bore that extends into the nut accessible through an opening at the proximal end to an internally threaded portion of the bore adjacent the distal end of the nut; and a spiral structure mounted on an exterior portion the distal end of the nut. The nut is shaped to be inserted through the aperture, along with the spiral structure, such that the central portion may be compressed so that the length of the nut is reduced, thereby compressing the spiral structure to form a support structure, such that the support structure and the flange together clamp the wall therebetween so that the rivet nut fastener is securely mounted on the wall.

2 Claims, 2 Drawing Sheets

(56) References Cited

U.S. PATENT DOCUMENTS

| | | | | |
|---|---|---|---|---|
| 4,147,458 | A | * | 4/1979 | Elders ................ F16B 13/0875 405/259.1 |
| 4,812,097 | A | | 3/1989 | Moulton |
| 4,886,405 | A | | 12/1989 | Blomberg |
| 5,074,726 | A | * | 12/1991 | Betchel ............... F16B 19/1054 411/34 |
| 5,184,922 | A | * | 2/1993 | Blackwell ............... F16B 13/06 405/259.1 |
| 5,316,422 | A | | 5/1994 | Coffman |
| 6,860,689 | B1 | | 3/2005 | Attanasio |
| 8,807,601 | B2 | | 8/2014 | Anderson |
| 10,316,883 | B2 | * | 6/2019 | Makino ................ F16B 37/048 |
| 2004/0156694 | A1 | * | 8/2004 | Behle .................. F16B 13/124 411/182 |
| 2005/0031433 | A1 | * | 2/2005 | Neri .................... B25B 27/0014 411/180 |
| 2006/0045649 | A1 | * | 3/2006 | Johnson .............. F16B 19/1072 411/38 |
| 2016/0265217 | A1 | * | 9/2016 | Hayes ..................... E04H 9/024 |
| 2017/0054227 | A1 | * | 2/2017 | Cumant ................. H01R 4/305 |
| 2018/0038406 | A1 | * | 2/2018 | Makino ................ F16B 37/067 |

* cited by examiner

RIVET NUT FASTENER

CROSS-REFERENCE TO RELATED APPLICATIONS

This application for a utility patent claims the benefit of U.S. Provisional Application No. 62/581,018, filed Nov. 2, 2017.

BACKGROUND OF THE INVENTION

Field of the Invention

This invention relates generally to fasteners, and more particularly to a blind fastener that is mounted on a wall through an aperture when the space behind the wall cannot be readily accessed.

Description of Related Art

The prior art teaches a variety of blind fasteners for mounting objects to a wall through an aperture when the space behind the wall cannot be readily accessed.

For example, the prior art teaches a wide variety of toggle bolts which include a cross-piece that can pivot to a lateral position such that the cross-piece extends across the opening through the wall, to prevent the bolt from being pulled back through the wall.

The prior art devices suffer serious disadvantages. Many prior art fasteners are difficult to install, and provide a weak mount that can be unreliable. Toggle bolts can be difficult to operate, and provide relatively weak and unreliable fastening ability. For example, when a lateral force is applied to a toggle bolt, from a direction traverse the cross-piece, the cross-piece provides very little stability to the bolt. There is a long-felt need in the art for a fastener device that is strong, reliable, easy to install, and which provides 360 degree support to the bolt of the fastener device.

SUMMARY OF THE INVENTION

The present invention teaches certain benefits in construction and use which give rise to the objectives described below.

The present invention provides a rivet nut fastener for mounting through an aperture in a wall. The rivet nut fastener comprises a cylindrical nut having a length that extends from a proximal end having an outwardly extending flange, through a central portion, to a distal end; a bore that extends into the nut accessible through an opening at the proximal end to an internally threaded portion of the bore adjacent the distal end of the nut; a spiral structure mounted on an exterior portion the distal end of the nut; the nut being shaped to be inserted through the aperture, along with the spiral structure, such that the central portion may be compressed so that the length of the nut is reduced, thereby compressing the spiral structure to form a support structure, such that the support structure and the flange together clamp the wall therebetween so that the rivet nut fastener is securely mounted on the wall.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a rivet nut fastener 10 that is adapted to be installed through an aperture 12 in the wall 14. This is particularly useful in situations in which the back side of the wall cannot readily be accessed, and the installation must be made entirely through the aperture. For purposes of this application, the term "wall" is defined to include any surface to which an attachment is desired, such as sheet metal or other surface of a vehicle (e.g., truck, automobile, boat, aircraft, etc.), a wall in a structure (i.e., drywall, exterior wall, etc.), or any other similar structure, including any associated structures, e.g., flanged inserts 16, etc. It is particularly useful in situations where the back of the wall cannot be accessed, or is difficult to access, but it may be used in other circumstances too.

Figure 1:
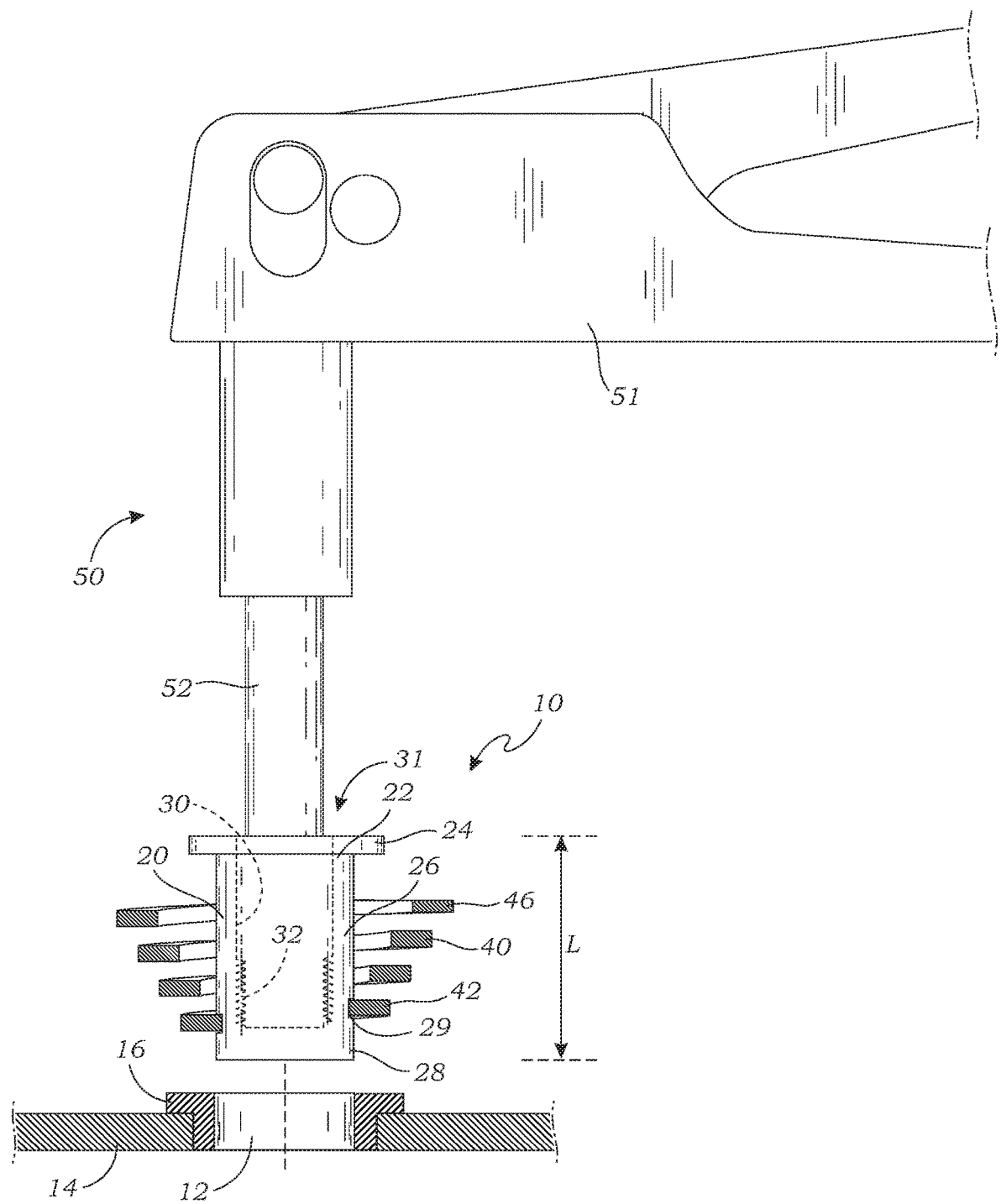
FIG. 1 is an exploded side elevational view of a rivet nut fastener according to one embodiment of the present invention, and an installation tool that is used for installing the rivet nut fastener through an aperture in a wall.
Figure 2:
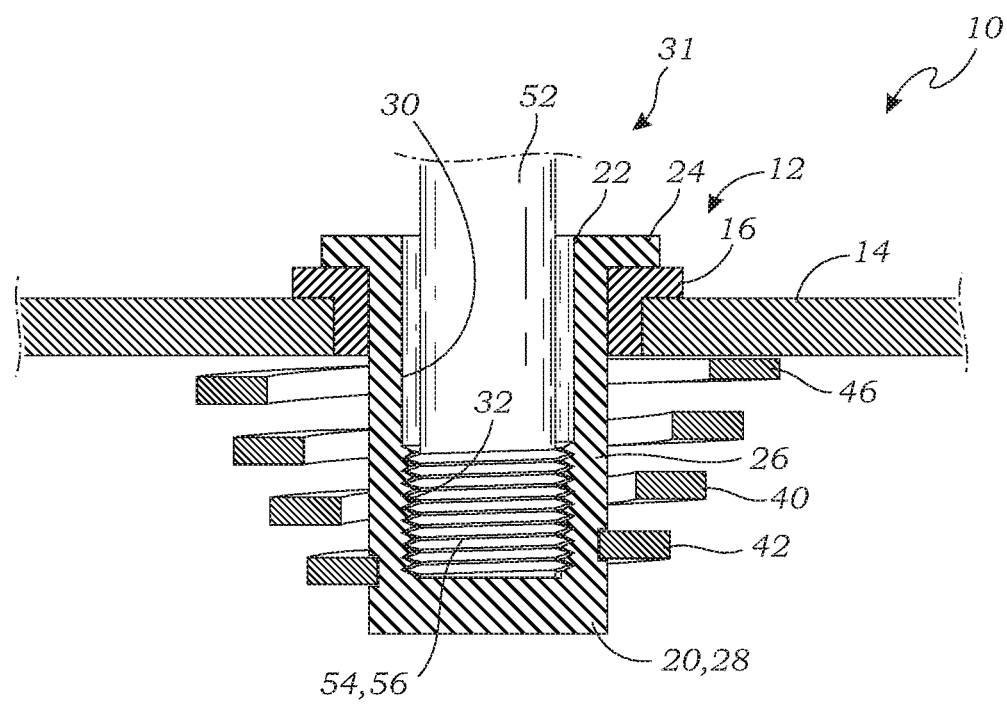
FIG. 2 is a side elevational cross-sectional view of the rivet nut fastener while it is mounted on the installation tool, illustrating how the installation tool is used to position the rivet nut fastener through the aperture in the wall, so that it may be installed.

FIG. 1 is an exploded side elevational view of the rivet nut fastener 10 according to one embodiment of the present invention. FIG. 2 is a side elevational cross-sectional view of the rivet nut fastener 10 operably mounted on the installation tool, illustrating the installation of the rivet nut fastener through the aperture 12 in the wall 14.

As shown in FIGS. 1 and 2, the rivet nut fastener 10 is in the form of a cylindrical nut 20 that extends a length L from a proximal end 22 having an outwardly extending flange 24, through a central portion 26, to a distal end 28, which may be closed, or alternatively may be open. A bore 30 extends into the nut accessible through an opening 31 at the proximal end, and extends to an internally threaded portion 32 at the distal end. The nut 10 is similar in general construction to a rivet nut, and may be formed of any suitable material commonly used for a rivet nut (e.g., aluminum, steel, etc.).

As shown in FIGS. 1 and 2, a spiral structure 40 is mounted on an exterior portion 29 of the distal end 28 of the nut 10, in this case in the form of an external groove of the nut, although other attachment systems or methods may alternatively be used. The spiral structure 40 may be in the form of a spiral wire or band made of a suitable material (e.g., steel, plastic, etc.) that extends from a smaller diameter lower end 42 to a larger diameter upper end 46, which has a larger diameter than the smaller diameter, and thereby forming the spiral shape, which is shaped and sized to be inserted through the aperture 12 in the wall 14 while in the uncompressed shape shown in FIGS. 1 and 2.

Also as shown in FIGS. 1 and 2, the rivet nut fastener 10 may be installed using an installation tool 50 that includes a shaft 52 extending from a lever device 51 or equivalent structure for moving the shaft 52, such as is well known in the art of rivet installation. A distal end 54 may have an interlocking feature 56, such as an externally threaded surface (or may include another suitable feature) for interlocking with the nut 10 as described in greater detail below.

Figure 3:
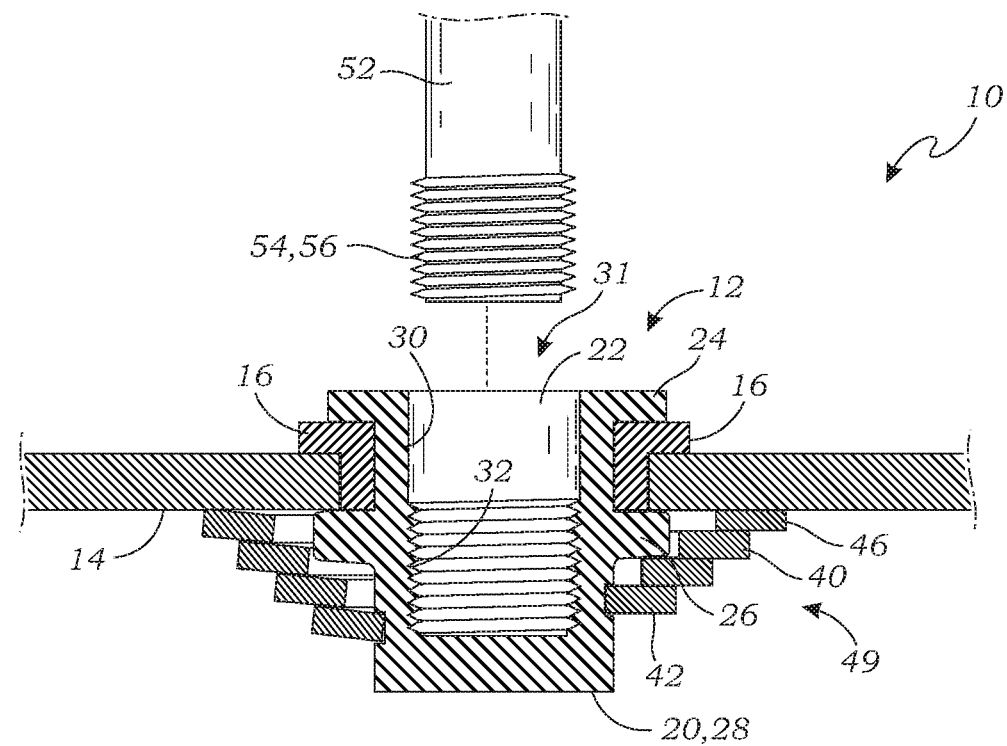
FIG. 3 is a side elevational cross-sectional view of the rivet nut fastener once it has been installed.

FIG. 3 is a side elevational cross-sectional view of the rivet nut fastener 10 once the installation tool 50 has been used to compress the nut 10, so that the center portion 26 of the nut bulges outwardly, and the length of the nut is reduced. Once the nut 10 has been compressed using the installation tool 50, the spiral structure 40 is compressed such that the spiral structure 40 forms a support structure 49 behind the wall 14, similar to a washer, such that the support structure 49 of the spiral structure 40 and the flange 24 together clamp the wall 14 therebetween so that the rivet nut fastener 10 is securely mounted on the wall 14.

As shown in FIGS. 1-3, the nut 10 is first inserted through the wall 14 as shown in FIGS. 1-2). This process also includes twisting the spiral structure 40 so that it also is able to pass through the aperture 12. This is typically performed while the nut 10 is mounted on the installation tool 50, as discussed above. The installation tool 50 is then used to pull the distal end 28 of the nut 10 towards the proximal end 22, thereby compressing the central portion so that the length of the nut is reduced, also thereby compressing the spiral structure to form the support structure as shown in FIG. 3, such that the support structure and the flange together clamp the wall therebetween so that the rivet nut fastener is securely mounted on the wall.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A rivet nut fastener for mounting through an aperture in a wall, the rivet nut fastener comprising:
   a cylindrical nut having a length that extends from a proximal end having an outwardly extending flange, through a central portion, to a distal end;
   a bore that extends into the cylindrical nut accessible through an opening at the proximal end to an internally threaded portion of the bore adjacent the distal end of the cylindrical nut;
   a spiral structure mounted on an exterior portion of the distal end of the cylindrical nut;
   the cylindrical nut being shaped to be inserted through the aperture, along with the spiral structure, such that the central portion may be compressed so that the length of the cylindrical nut is reduced, thereby compressing the spiral structure to form a support structure, such that the support structure and the outwardly extending flange together clamp the wall therebetween so that the rivet nut fastener is securely mounted on the wall.

2. A rivet nut fastener for mounting through an aperture in a wall, the rivet nut fastener comprising:
   a cylindrical nut having a length that extends from a proximal end having an outwardly extending flange, through a central portion, to a distal end;
   a bore that extends into the cylindrical nut accessible through an opening at the proximal end to an internally threaded portion of the bore adjacent the distal end of the cylindrical nut;
   a spiral structure mounted on an exterior portion of the distal end of the cylindrical nut, wherein the spiral structure extends from a lower end to an upper end, the upper end having a larger diameter than a diameter of the aperture in the wall, while the lower end has a smaller diameter than the diameter of the aperture in the wall, and of the upper end, thereby forming a spiral shape;
   the cylindrical nut being shaped to be inserted through the aperture, along with the spiral structure, such that the central portion may be compressed so that the length of the cylindrical nut is reduced, thereby compressing the spiral structure to form a support structure, such that the support structure and the outwardly extending flange together clamp the wall therebetween so that the rivet nut fastener is securely mounted on the wall.

* * * * *